United States Patent [19]
Blanco et al.

[11] Patent Number: 5,783,525
[45] Date of Patent: Jul. 21, 1998

[54] OIL IN WATER EMULSION WELL SERVICING FLUIDS

[75] Inventors: José Blanco, San Jose; Lirio Quintero, Las Mercedes, both of Venezuela

[73] Assignee: Intevep, S.A., Caracas, Venezuela

[21] Appl. No.: 842,495

[22] Filed: Apr. 24, 1997

[51] Int. Cl.$^6$ .................................... C09K 7/02
[52] U.S. Cl. ............... 507/252; 567/134; 567/135; 567/136; 567/259; 567/261; 252/311
[58] Field of Search ..................... 507/134, 135, 507/136, 139, 252, 259, 261, 264, 266; 252/311

[56] References Cited

U.S. PATENT DOCUMENTS

| | | | |
|---|---|---|---|
| 4,970,007 | 11/1990 | Miller et al. | 507/135 |
| 5,007,489 | 4/1991 | Enright et al. | 507/136 |
| 5,254,291 | 10/1993 | Crutcher et al. | 510/126 |
| 5,310,002 | 5/1994 | Blauch et al. | 507/252 |
| 5,318,709 | 6/1994 | Wuest et al. | 507/259 |
| 5,323,857 | 6/1994 | Pirri et al. | 507/134 |
| 5,439,059 | 8/1995 | Harris et al. | 507/261 |
| 5,535,834 | 7/1996 | Naraghi et al. | 507/135 |
| 5,652,200 | 7/1997 | Davies et al. | 507/135 |

*Primary Examiner*—Philip Tucker
*Attorney, Agent, or Firm*—Bachman & LaPointe, P.C.

[57] ABSTRACT

A thermally stable well servicing fluid includes a fluid portion in the form of an oil-in-water emulsion; and a surfactant mixture including an anionic surfactant selected from the group consisting of alkali metal salts of alkyl sulphates, alkali metal salts of alkyl sulphonates, and mixtures thereof, and a non-ionic surfactant selected from the group consisting of ethoxylated alkyl phenols, ethoxylated aliphatic alcohols and mixtures thereof, the surfactant mixture containing the anionic surfactant and the non-ionic surfactant at a ratio by weight of between about 70:30 to about 80:20, the fluid being stable at temperatures exceeding 220° F.

23 Claims, No Drawings

5,783,525

OIL IN WATER EMULSION WELL SERVICING FLUIDS

BACKGROUND OF THE INVENTION

The invention relates to well servicing fluids such as drilling mud, workover fluid, rehabilitation fluid, completion fluid and the like, and more specifically to a thermally stable oil-in-water emulsion well servicing fluid.

Various well-related activities such as drilling, completion, rehabilitation and the like involve the use of well servicing fluids for resolving typical problems related to the well including control of formation pressure, circulation of cuttings out of the well, lubrication of well equipment, and the like.

Problems frequently encountered include well servicing fluid stability at high temperatures and in the presence of salt typically encountered in downhole environments, as well as formation damage that can be caused by loss of solids from the fluid into the formation, and other factors in connection with the well servicing fluid. In addition, the development and use of more environmentally acceptable fluids for oil well operations has ever increasing importance.

A number of publications deal with well servicing fluids and attempt to overcome some of these problems. Examples of such publications include GB 2,283,036, GB 2,171,127, GB 2,120,708, U.S. Pat. No. 4,812,244, U.S. Pat. No. 4,552,670, U.S. Pat. No. 5,228,341, U.S. Pat. No. 5,330,662, GB 2,066,876 and GB 2,268,953. Additional efforts are disclosed in U.S. Pat. Nos. 5,425,806, 4,064,056 and 4,374,737.

Despite the foregoing, the need remains for a thermally stable well servicing fluid having good stability at elevated temperatures and in the presence of salt, and having a reduced tendency toward formation damage.

It is therefore the primary object of the present invention to provide a well servicing fluid which exhibits stability at high operating temperatures.

It is a further object of the present invention to provide a well servicing fluid which has reduced tendency toward formation damage.

It is still another object of the present invention to provide a well servicing fluid having desirable rheological properties.

It is a further object of the present invention to provide a surfactant mixture additive for a well servicing fluid which accomplishes the above object of the present invention in terms of thermal stability and reduced formation damage.

Other objects and advantages of the present invention will appear hereinbelow.

SUMMARY OF THE INVENTION

In accordance with the present invention, the foregoing objects and advantages are readily attained.

In accordance with the invention, a thermally stable well servicing fluid is provided, which fluid comprises a fluid portion in the form of an oil-in-water emulsion; and a surfactant mixture comprising an anionic surfactant selected from the group consisting of alkali metal salts of alkyl sulphates, alkali metal salts of alkyl sulphonates, and mixtures thereof, and a non-ionic surfactant selected from the group consisting of ethoxylated alkyl phenols, ethoxylated aliphatic alcohols and mixtures thereof, said surfactant mixture containing said anionic surfactant and said non-ionic surfactant at a ratio by weight of between about 70:30 to about 80:20, said fluid being stable at temperatures exceeding 220° F.

In further accordance with the invention, enhanced stability has been found to be provided, for example up to temperatures of about 300° F., at a preferred ratio of the aforesaid anionic surfactant to non-ionic surfactant of between about 74:26 to about 78:22, most preferably about 75:25.

Well servicing fluid including the surfactant mixture of the present invention has been found to exhibit excellent stability under conditions including high temperature and the presence of salt.

DETAILED DESCRIPTION

The invention relates to a thermally stable well servicing fluid in the form of an oil-in-water emulsion having a surfactant mixture additive, as well as to a well servicing fluid additive per se. The additive may be used advantageously in preparing well servicing fluids such as drilling mud, completion fluid, workover fluid, rehabilitation fluid and the like.

In accordance with the invention, a thermally stable well servicing fluid is provided having a fluid portion in the form of an oil-in-water emulsion, i.e., an emulsion of oil droplets in a dispersed water phase, and further including a surfactant mixture having specific components and specific portions which have been found in accordance with the present invention to provide excellent emulsion stability at elevated temperatures.

According to the invention, the surfactant mixture for providing thermal stability and other desirable fluid characteristics comprises a combination of an anionic surfactant selected from the group consisting of alkali metal salts of alkyl sulphates, alkali metal salts of alkyl sulphonates, and mixtures thereof, and a non-ionic surfactant selected from the group consisting of ethoxylated alkyl phenols, ethoxylated aliphatic alcohols and mixture thereof, wherein the surfactant mixture contains anionic surfactant and non-ionic surfactant at a ratio by weight of between about 70:30 to about 80:20. As will be set forth and demonstrated below, a well servicing fluid including the surfactant mixture of the present invention shows emulsion stability at temperatures exceeding 220° F., preferably up to temperatures of about 280° F. and ideally up to temperatures of about 300° F.

In various well servicing fluid environments, certain fluid components may be present intentionally as an additive or incidentally as a contaminant which tend to reduce the stability of the oil-in-water emulsion well servicing fluid, particularly at high temperatures. Such ingredients include, in particular, salts such as alkali metal salts. According to the invention, the addition of the surfactant mixture of the present invention to well servicing fluid provides the fluid with enhanced stability at elevated temperatures even in the presence of such salt.

According to the invention, suitable anionic surfactants include alkali metal salts of alkyl sulphates, alkali metal salts of alkyl sulphonates, and mixtures thereof as set forth above. Preferred anionic surfactants are alkali lauryl sulphates, especially sodium lauryl sulphate.

Suitable non-ionic surfactants include ethoxylated alkyl phenols, ethoxylated aliphatic alcohols and mixtures thereof, preferably nonyl phenol ethoxylated with between about 20 to about 40 ethylene oxide groups, more preferably nonyl phenol ethoxylated with about 35 ethylene oxide groups. Additional preferred non-ionic surfactants include biodegradable materials such as biodegradable polyoxyethylene alcohol ethoxylated with between about 25 to about 35 ethylene oxide groups, preferably biodegradable tridecyl alcohol.

According to the invention, the ratio of anionic to non-ionic surfactant in the surfactant mixture has been found to be critical in providing enhanced fluid stability, especially in the presence of salt. In the substantial absence of alkali metal salt, ratios of anionic to non-ionic surfactant have been found to be effective in the range of between about 70:30 to about 80:20 by weight and in concentrations of the surfactant mixture in the well servicing fluid of preferably between about 5,000 ppm to about 20,000 ppm. In the presence of alkali metal salt, the ratio of anionic to non-ionic surfactant in the surfactant mixture is preferably between about 74:26 to about 78:22, and most preferably is about 75:25, and the surfactant mixture is preferably used in a concentration relative to the well servicing fluid of at least about 20,000 ppm. The additive of the present invention has been found to provide stability in well servicing fluids in the presence of up to about 15,000 ppm of salt.

As will be set forth below, well servicing fluid including surfactant mixture in accordance with the present invention shows emulsion stability at temperatures exceeding 220° F., preferably up to about 280° F. and ideally up to about 300° F. or higher. For example, and as will be demonstrated below, in the presence of 10,000 ppm or higher of alkali metal salts such as potassium chloride, the provision of a well servicing fluid having surfactant mixture according to the invention at a ratio of anionic to non-ionic surfactant of between about 74:26 to about 78:22 shows excellent stability at elevated temperatures.

The oil-in-water emulsion well servicing fluid in accordance with the present invention may suitably be a well fluid tailored toward use as a drilling mud, a completion fluid, a workover fluid or a rehabilitation fluid, or as any other well servicing fluid which may be desired. Such fluids are typically provided having a relatively low density, for example between about 7.3 to about 10 lb/gal. These well servicing fluids, when treated with the surfactant mixture of the present invention, nevertheless provide a substantially solid-free well servicing fluid also having a low filtration volume or fluid loss which advantageously avoids or reduces the substantial reduction in permeability of a porous strata in a formation of interest which is typical during operations such as drilling, or during workover in established oil wells.

The ratio of oil to water in a suitable oil-in-water emulsion may typically be between about 50:50 to about 70:30, although other oil to water ratios may be desired depending upon the specific well servicing fluid. As the oil phase, preferred oils include hydrocarbons selected from the group consisting or mineral oils such as gasoil, diesel, kerosene, n-paraffins, waxes and the like, and biodegradable oils such as ester derivatives of vegetable oils, ester derivatives of carboxylic acids and the like.

Depending upon the type of well servicing fluid desired, additional additives may be included for providing a particular desired fluid quality. For example, drilling mud fluid may suitably be provided as a 50:50 oil-in-water emulsion including an additive according to the invention, a densifying agent, a fluid control agent, and the like, and may also include, either intentionally or incidentally, salts such as alkali metal salts as discussed above.

Numerous densifying agents are known to be effective in accordance with the present invention for providing a desired fluid density.

Suitable fluid loss control agents include starch, xanthan gum, cellulose derivative, polysaccharides and the like, although other additives can be used if desired.

Alkali metal salts, if present, may typically be present in the form of potassium chloride and the like.

In the case of a water-based workover fluid, the fluid may additionally include an organic or inorganic (alkali) base, a clay inhibitor, and possibly alkali metal salt as discussed above.

In the presence of an alkali metal salt, the base of the workover fluid is preferably an inorganic base selected from the group consisting of sodium hydroxide, potassium hydroxide and mixtures thereof. When substantially no alkali metal salt is present, organic bases such as alkanolamines and the like may be desired.

Clay inhibitors are well known in the art and may be selected based upon desired characteristics of a particular well servicing fluid.

In accordance with the present invention, a thermally stable well servicing fluid has been provided which possesses excellent rheological characteristics and maintains oil-in-water emulsion stability in the presence of high temperatures and/or alkali metal salts.

The following examples further demonstrate the advantages of the present invention.

EXAMPLE 1

This example demonstrates the effectiveness of the surfactant mixture additive of the present invention as an additive to a completion/drilling well servicing fluid. In this example, seven samples (I–VII) of the additive were prepared as follows. In preparation of the samples, the anionic surfactant was sodium lauryl sulphate (Genapol S28V™ from Hoechst). The non-ionic surfactant was nonyl phenol ethoxylated with thirty ethylene oxide groups (Arkopal N-300™ from Hoechst). The samples of surfactant additive were prepared having proportions by weight of anionic surfactant/non-ionic surfactant of 10/90 (I), 40/60 (II), 60/40 (III), 75/25 (IV), and 90/10 (V), as well as a Sample VI having 100% sodium lauryl sulphate and a Sample VII having 100% ethoxylated nonyl phenol. Seven emulsion formulations were prepared according to the following procedure. Samples I–VII in amounts sufficient to obtain the equivalent to a barrel of mud in a ratio of oil to water of 70:30 were mixed with the water phase under controlled velocity until a light foam appeared. This mixture was initially mixed at rates of between about 1,000 rpm to about 4,000 rpm. Each solution was then added to sufficient gasoil during mixing at about 12,000 rpm for about 1–3 minutes so as to obtain a 70:30 oil-in-water emulsion wherein the surfactant additive was present in a total concentration of 20,000 ppm based upon the total fluid. The seven fluids prepared with each of Samples I–VII were then evaluated at room temperature and after aging for 15 hours at 280° F. In this example, no salt was present. The mean droplet diameter of each emulsion, plastic viscosity, yield stress and gel strength according to API-Spec 13B-1 are set forth below in Table 1.

TABLE 1

| SAMPLE | MEAN DIAMETER (μm) (Initial/aged) | PLASTIC VISCOSITY (cP) | YIELD STRESS (lb/100 ft$^2$) |
| --- | --- | --- | --- |
| I | 2.04/2.94 | 37/26 | 41/24 |
| II | 1.48/1.51 | 37/43 | 30/43 |
| III | 2.51/2.31 | 47/20 | 22/15 |
| IV | 1.64/2.42 | 33/24 | 43/12 |
| V | 2.08/3.30 | 22/17 | 56/08 |
| VI | broken emulsion | — | — |
| VII | broken emulsion | — | — |

As clearly set forth in Table 1 above, each sample including anionic and non-ionic surfactants showed values within desired specifications. The samples with only anionic or only non-ionic surfactants resulted in an unstable and broken emulsion. Thus, when no salt is present, each of Samples I–V give acceptable rheological values despite some relatively large droplet sizes.

EXAMPLE 2

This example demonstrates the effect of temperature on the capacity of additives of the present invention for maintaining stability of a completion fluid emulsion. To samples of completion fluids I–VII of Example 1 above, 10,000 ppm of potassium chloride and ethanolamine in an amount sufficient to adjust the pH to between about 9.0 to about 9.5 were added. The rheological properties of resulting fluids were measured before and after aging at both 220° F. and 280° F. for 16 hours.

For comparison, additional commercial anionic surfactants were used to prepare completion fluids in the same manner, with Sample VIII being an additive comprising 100% sodium dodecyl benzene sulphonate (Hostapur SAS-30™) and Sample IX being 100% petroleum sulphonate, both additives from Hoechst. The measured rheological properties for all samples are set forth below in Table 2.

TABLE 2

| SAMPLE | MEAN DIAMETER (μm) | | PLASTIC VISCOSITY (cP) | | YIELD STRESS (lb/100 ft$^2$) | |
|---|---|---|---|---|---|---|
| | 220° F. | 280° F.) | 220° F. | 280° F. | 220° F. | 280° F. |
| I | 2.0/** | 1.9/** | 37/** | 36/** | 41/** | 40/** |
| II | 1.6/15 | 2.5/** | 29/25 | 29/** | 24/39 | 23/** |
| III | 2.5/8 | 1.9/** | 24/24 | 39/** | 16/16 | 23/** |
| IV | 1.9/2 | 1.9/3.4 | 20/16 | 20/16 | 15/7 | 15/7 |
| V | 2.1.** | 2.5/** | 29/** | 20/** | 23/** | 12/** |
| VI* | 90.0 | ** | — | | — | |
| VII* | 2.9 | 20 | — | | — | |
| VIII* | 105 | ** | — | | — | |
| IX* | 301 | ** | — | | — | |

*10,000 ppm total surfactant concentration; pH: 12
**completely destabilized after aging test As shown in Table 2, only Sample IV having a surfactant ratio of 75:25 maintained both emulsion stability and good rheological properties. Samples VI–IX using only one or the other of anionic or non-ionic surfactants all became unstable.

Additional Samples VIIIB and IXB were prepared as described above to provide an oil-in-water emulsion having a ratio of oil:water of 70:30, and were prepared at a pH of 12 in the presence of 10,000 ppm of potassium chloride. Sample VIIIB and IXB were prepared having a ratio of anionic surfactant to non-ionic surfactant of 40:60, with Sample VIIIB having sodium dodecyl benzene sulphonate and nonyl phenol ethoxylated with approximately 30 ethylene oxide groups, and Sample IXB having petroleum sulphonate and nonyl phenol ethoxylated with approximately 30 ethylene oxide groups. Fluids from Samples VIIIB and IXB were tested before and after aging at 220° F. for 15 hours. The mean droplet diameters for Sample VIIIB, before and after aging, were 1.95/1.58 microns, and for Sample IXB were 2.22/1.68 microns. Thus, Samples VIIIB and IXB show the improved stability for emulsion systems obtained using both anionic and non-ionic surfactants.

EXAMPLE 3

This example demonstrates that when salt is present in amounts greater than or equal to a out 10,000 ppm, concentrations of surfactant in the well servicing fluid of at least about 20,000 ppm are desired, and a specific preferred range of ratios of anionic to non-ionic surfactant is advantageous. Completion fluids were prepared using Samples I–V of Example 1 above, having concentrations of surfactant of 5,000, 10,000 and 20,000 ppm. To each fluid, 10,000 ppm of potassium chloride were added, and the fluids were aged at 280° F. for 15 hours. Measurements were taken, and the results are shown below in Table 3.

TABLE 3

| SAMPLE | Total surfac. 5,000 ppm | Total surfac. 10,000 ppm | Total surfac. 20,000 ppm |
|---|---|---|---|
| I | unstable | unstable | unstable |
| II | unstable | unstable | unstable |
| III | unstable | unstable | unstable |
| IV | unstable | unstable | STABLE |
| V | unstable | unstable | unstable |

As set forth above, in the presence of salt and temperatures exceeding 280° F., best results are obtained using 20,000 ppm of the surfactant mixture having a ratio of anionic to non-ionic surfactant of 75:25.

EXAMPLE 4

This example further demonstrates the limits of the preferred range of ratios of anionic to non-ionic surfactant in accordance with the present invention. Anionic and non-ionic surfactants as in Example 1 were used following the same procedure as Example 1 to prepare several completion fluids at ratios of anionic to non-ionic surfactant of 70:30 (IA), 73:27 (IIA), 74:26 (IIIA), 78:22 (IVA), 79:21 (VA). To each fluid was added 15,000 ppm of potassium chloride, and each fluid was then heated to 300° F. Rheological properties were measured before and after heating, and the results are set forth in Table 4 below.

TABLE 4

| SAMPLE | MEAN DIAMETER (μm) | PLASTIC VISCOSITY (cP) | YIELD STRESS (lb/100 ft$^2$) |
|---|---|---|---|
| IA | 1.9/** | 10/** | 12/** |
| IIA | 2.5/** | 12/** | 10/** |
| IIIA | 2.0/26 | 11/10 | 10/2 |
| IVA | 2.0/30 | 10/10 | 11/2 |
| VA | 1.9/** | 12/** | 12/** |

**completely destabilized after aging test

As shown in Table 4, Samples IIIA and IVA show very good performance under these extreme conditions. Thus, in the presence of 15,000 ppm potassium chloride and temperatures of 300° F., preferred ratios of anionic to non-ionic surfactant are between about 74:26 to about 78:22.

EXAMPLE 5

This example demonstrates the advantageous formulation according to the invention of a fluid using biodegradable components. In this case, instead of gasoil as the oil phase, an ester derivative of soy oil was used to prepare an oil-in-water emulsion as a completion fluid using, as a non-ionic surfactant, an ethoxylated tridecyl alcohol having 30 ethylene oxide groups. Anionic surfactant was the same as used in Example 1, and the ratio of anionic to non-ionic surfactant was 75:25. To this sample was added 10,000 ppm of potassium chloride, and the system was aged at 120° F. and also at 300° F. The results are set forth in Table 5 below.

TABLE 5

| T(°F.) | MEAN DIAMETER (μm) | PLASTIC VISCOSITY (cP) | YIELD STRESS (lb/100 ft²) |
|---|---|---|---|
| 120 | 2.05 | 25 | 22 |
| 300 | 2.30 | 22 | 17 |

As shown in Table 5, despite high temperatures and high salt concentrations, the biodegradable emulsion formulation of this example maintained excellent stability and rheological properties.

EXAMPLE 6

This example demonstrates the use of the additive of the present invention to form a well servicing fluid for use as a drilling mud or fluid. An aqueous drilling mud in the form of an oil-in-water emulsion was prepared having a 50:50 oil to water ratio. Three fluids, (Samples IB–IIIB), were prepared having a density of 8.0, 9.0 and 10.0 lb/gal. respectively. These fluids were prepared using surfactant of Sample IV of Example 1 above (having anionic/non-ionic ratio of 75:25) in a concentration of 20,000 ppm with respect to the fluid. The sample was mixed with calcium carbonate in amounts of 17, 81 and 145 lb/bbl, respectively, as a densifying agent, with 4.0–6.0 lb/bbl of starch, and 0.5 lb/bbl of xanthan gum for fluid loss control. Rheological properties of the fluids were measured after aging at 220° F. Results of the measurements are set forth in Table 6 below.

TABLE 6

| SAMPLE | DENSITY (lb/gal) | PLASTIC VISCOSITY (cP) | YIELD STRESS (lb/100 ft²) | GEL STRENGTH (10"/10') | FILTRATE API (cc) |
|---|---|---|---|---|---|
| IB | 8.0 | 40 | 47 | 17/19 | 2.6 |
| IIB | 9.0 | 41 | 44 | 9/10 | 2.4 |
| IIIB | 10.0 | 56 | 28 | 12/13 | 2.6 |

As set forth in Table 6 the drilling mud composition according to the present invention yields excellent results in terms of fluid loss or filtrate volume, thereby guarding against the settling of cuttings and other solids to the bottom of the hole, and also providing excellent gel strength for use in low pressure oil wells.

EXAMPLE 7

This example illustrates the reduced tendency to formation damage exhibited by completion/drilling fluid in accordance with the present invention. Surfactant Sample IV of Example 1 was used in a reservoir model simulating core formation conditions including permeability between 800 and 1500 mD, at neutral and basic pH conditions. The tests were carried out in the absence of potassium chloride, and in the presence of 3,000 ppm potassium chloride, and the resulting permeability modification or reduction in permeability is set forth in Table 7 below.

TABLE 7

| SAMPLE | without KCl | 3000 ppm KCl |
|---|---|---|
| pH = 7 | 40.3% | 12.7% |
| pH = 9 (KOH) | 22.7% | 5.6% |
| pH = 9 (ethanolamine) | 0% | 0% |

As shown, when ethanolamine is used, the permeability modification of the simulated formation is advantageously totally reduced, with or without salt. Also, when no salt is present it is preferred to include an organic base (KOH). Thus, completion/drilling fluid according to the present invention has favorable qualities in connection with reduction of formation damage.

EXAMPLE 8

This example shows the effect of salt concentration on the stability of well servicing fluid emulsions as well drilling or completion fluid and rehabilitation fluid. In this example, Sample IV of Example 1 was used as the surfactant. Fluids were prepared as set forth in Example 1, in the presence of 0, 3,000 and 10,000 ppm of potassium chloride. The fluids were tested before and after aging at 300° F. for 15 hours, and the results are shown below in Table 8.

TABLE 8

| KCl (ppm) | MEAN DIAMETER (μm) | PLASTIC VISCOSITY (cP) | YIELD STRESS (lb/100 ft²) | GEL STRENGTH (lb/100 ft²) 10" | 10' |
|---|---|---|---|---|---|
| 0 | 2.05/1.95 | 33/24 | 43/12 | 11/2 | 11/4 |
| 3,000 | 2.51/2.31 | 47/20 | 22/15 | 11/5 | 9/4 |
| 10,000 | 1.97/3.40 | 20/16 | 15/7 | 5/2 | 6/2 |

As set forth above, using Sample IV in accordance with the invention, well servicing fluids maintain excellent rheological properties despite the presence of salt, all within standard specifications.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A thermally stable well servicing fluid, comprising:
   a fluid portion in the form of an oil-in-water emulsion; and
   a surfactant mixture comprising an anionic surfactant selected from the group consisting of alkali metal salts of alkyl sulphates, alkali metal salts of alkyl sulphonates, and mixtures thereof, and a non-ionic surfactant selected from the group consisting of ethoxylated alkyl phenols, ethoxylated aliphatic alcohols and mixtures thereof, said surfactant mixture containing said anionic surfactant and said non-ionic surfactant at a ratio by weight of between about 70:30 to about 80:20, said fluid being stable at temperatures exceeding about 220° F.

2. A well servicing fluid according to claim 1, wherein said fluid is stable at temperatures up to about 280° F.

3. A well servicing fluid according to claim 1, wherein said surfactant mixture contains said anionic surfactant and non-ionic surfactant at a ratio of between about 74:26 to about 78:22, and is stable at temperatures up to about 300° F.

4. A well servicing fluid according to claim 1, wherein said mixture contains said anionic surfactant and said non-ionic surfactant at a ratio of about 75:25.

5. A well servicing fluid according to claim 1, wherein said surfactant mixture is present in said well servicing fluid in an amount between about 5,000 ppm to about 20,000 ppm.

6. A well servicing fluid according to claim 1, wherein said surfactant mixture is present in said well servicing fluid in an amount of at least about 20,000 ppm, and said fluid is stable in the presence of salt in amounts up to about 15,000 ppm.

7. A well servicing fluid according to claim 1, wherein said anionic surfactant is an alkali lauryl sulphate.

8. A well servicing fluid according to claim 1, wherein said anionic surfactant is sodium lauryl sulphate.

9. A well servicing fluid according to claim 1, wherein said non-ionic surfactant is nonyl phenol ethoxylated with between about 20 to about 40 ethylene oxide groups.

10. A well servicing fluid according to claim 1, wherein said non-ionic surfactant is nonyl phenol ethoxylated with 35 ethylene oxide groups.

11. A well servicing fluid according to claim 1, wherein said non-ionic surfactant is biodegradable polyoxyethylene-alcohol ethoxylated with between about 25 to about 35 ethylene oxide groups.

12. A well servicing fluid according to claim 1, wherein said polyoxyethylene alcohol is tridecyl alcohol.

13. A well servicing fluid according to claim 1, wherein said anionic surfactant is sodium lauryl sulphate and said non-ionic surfactant is nonyl phenol ethoxylated with between about 20 to about 40 ethylene oxide groups, and wherein said sodium lauryl sulphate and nonyl phenol are present at a ratio of sodium lauryl sulphate to nonyl phenol of about 75:25.

14. A well servicing fluid according to claim 1, wherein said fluid portion comprises a water-based drilling mud wherein said oil-in-water emulsion has an oil phase selected from the group consisting of mineral oil, biodegradable oil and mixtures thereof, and further comprising a densifying agent, a fluid loss control agent, and an alkali metal salt in an amount up to about 15,000 ppm, wherein said well servicing fluid is stable at temperatures exceeding 220° F.

15. A well servicing fluid according to claim 14, wherein said fluid loss control agent is selected from the group consisting of starch, xanthan gum, cellulose derivative, polysaccharide and mixtures thereof.

16. A well servicing fluid according to claim 14, wherein said oil phase is a biodegradable oil selected from the group consisting of ester derivatives of vegetable oils, ester derivatives of carboxylic acids and mixtures thereof.

17. A well servicing fluid according to claim 14, wherein said oil phase is a mineral oil selected from the group consisting of gasoil, diesel, kerosene, n-paraffins, waxes, and mixtures thereof.

18. A well servicing fluid according to claim 14, wherein said non-ionic surfactant is biodegradable polyoxyethylene alcohol having between about 25 to about 35 ethylene oxide groups.

19. A well servicing fluid according to claim 1, wherein said fluid portion is a workover fluid in the form of said oil-in-water emulsion having an oil phase selected from the group consisting of mineral oil, biodegradable oil, and mixtures thereof, and further comprising a base, a clay inhibitor, and up to about 15,000 ppm alkali metal salt, wherein said emulsion is stable at temperatures exceeding 220° F.

20. A well servicing fluid according to claim 19, wherein said oil phase is a hydrocarbon selected from the group consisting of gasoil, diesel, kerosene, paraffinic oil, wax and mixtures thereof.

21. A well servicing fluid according to claim 19, wherein said base is an inorganic base selected from the group consisting of sodium hydroxide, potassium hydroxide and mixtures thereof.

22. A well servicing fluid according to claim 19, wherein said alkali metal salt is potassium chloride.

23. A surfactant mixture for enhancing stability of a well servicing fluid, comprising an anionic surfactant selected from the group consisting of alkali metal salts of alkyl sulphates, alkali metal salts of alkyl sulphonates and mixtures thereof, and a non-ionic surfactant selected from the group consisting of ethoxylated alkyl phenols, ethoxylated aliphatic alcohols and mixtures thereof, said surfactant mixture containing said anionic surfactant and said non-ionic surfactant at a ratio by weight of between about 70:30 to about 80:20.

* * * * *